Patented July 24, 1951

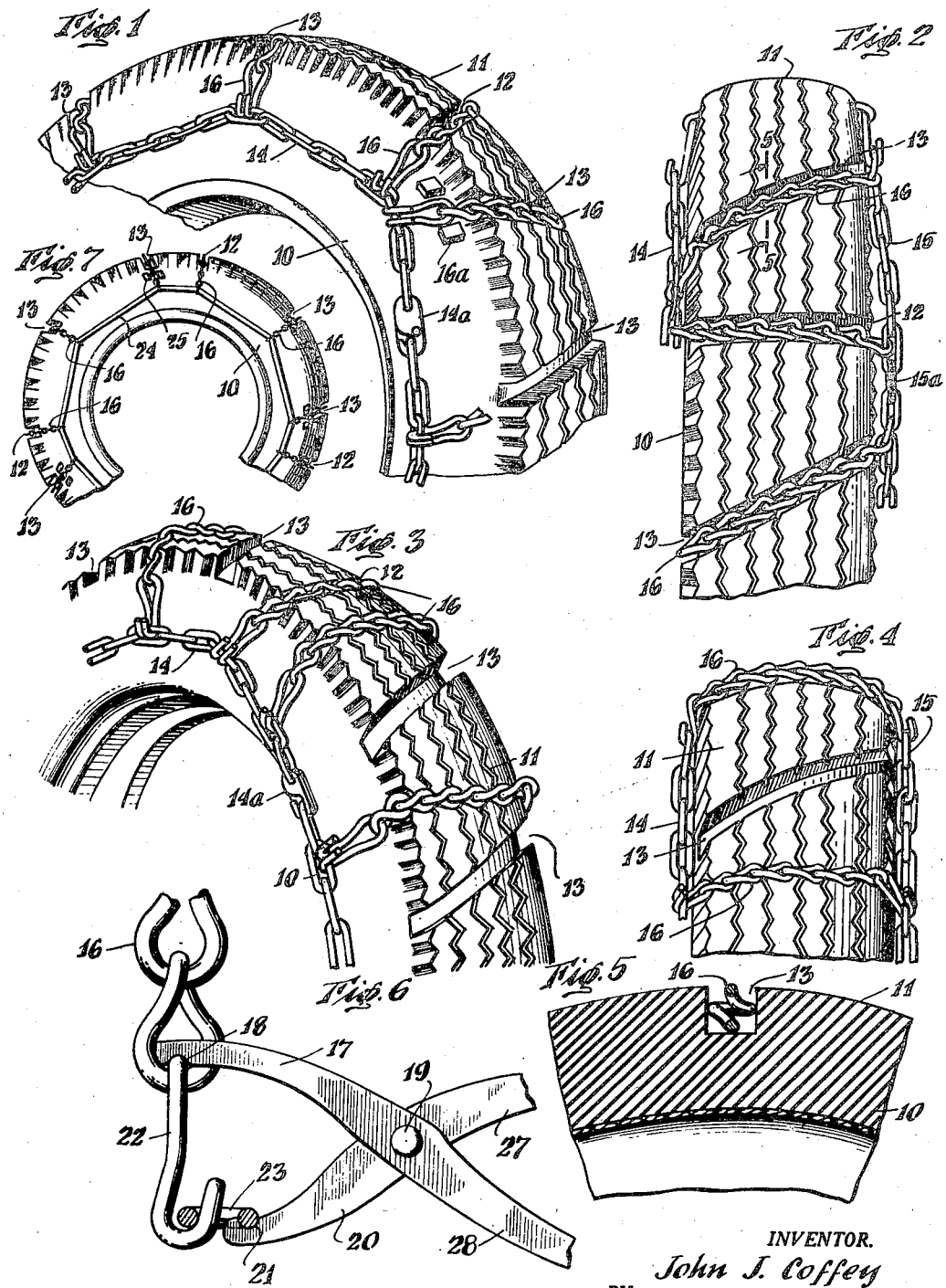

2,561,910

UNITED STATES PATENT OFFICE 2,561,910

QUICK ADJUSTING TRACTION DEVICE FOR VEHICLE WHEELS

John J. Coffey, Rutherford, N. J.

Application December 11, 1948, Serial No. 64,762

10 Claims. (Cl. 152—208)

This invention relates to a traction device and particularly to a traction device to be used on wheeled vehicles.

In geographic locations where snow and icy road conditions are of an intermittent nature either in place or time or character, many of the existing anti-skid or traction devices for rubber tired vehicles are not readily adaptable to the changing road conditions. An object of this invention is to provide an anti-skid or traction device that is readily adaptable to changing road conditions with a minimum of adjustment.

Thus it often happens in any given locality that major highways and streets are clear or partly ice-coated while minor roads remain covered with snow and ice, often heavy snow, or that within several days or even within a single day, general road conditions may change radically in such respects by reason of snow, rain, rise and fall of temperature, and so forth. In consequence and because the application or removal of tire chains is a cumbersome and unpleasant task, the average, careful motorist is inclined to keep chains on the wheels of his car continuously. Nevertheless the result is very unsatisfactory, since on dry or partially iced roads the chain cross-links wears out with great rapidity and the necessary frequent stops for repair or replacement are a source of great annoyance and inconvenience, which cannot be avoided if the chains must be worn all the time. Even on wet or ice-coated streets the wear and breakage of tire chains may be disproportionate to the anti-skid requirements, such chains being primarily designed to meet the more serious but less wearing traction problems of soft snow, slush and mud. The present invention is accordingly designed to avoid or minimize all of these difficulties.

In general, moreover, many of the existing anti-skid devices which usually provide satisfactory traction in heavy snow or soft earth without undue vibratory effects, fail to provide satisfactory traction on icy surfaces or on hard packed snow. In addition and even where devices such as chains may be deemed satisfactory on icy surfaces or the like, such use of the prior devices is often accompanied by uncomfortable vibratory effects. Another object of this invention is to provide a device that will assure satisfactory traction and anti-skid protection, irrespective of the road condition and with a minimum of accompanying vibration.

Another object of this invention is to provide a traction device of improved tractional qualities irrespective of the road conditions.

Referring to the drawings:

Figure 1 is a partial perspective view of the traction device set for use on ice or hard packed snow;

Fig. 2 is a top view of the device shown in Fig. 1;

Fig. 3 is a partial perspective view of the traction device set for use in heavy snow or soft earth;

Fig. 4 is a top view of the device shown in Fig. 3;

Fig. 5 is a sectional view on the line 5—5 of Fig. 2;

Fig. 6 is a side view of a tool used to adjust the device; and

Fig. 7 is a side view of the traction device using a mounting cable.

In conventional anti-skid and traction devices of the type wherein a chain device encompasses a wheel, the cross chain members usually are disposed in a spaced relationship traversing the surface of the tire tread. This positioning of the cross chain members in effect provides an uneven or corrugated wheel periphery for increased tractional qualities when the vehicle is traveling through heavy snow or soft earth. However, if the vehicle is traveling over hard packed snow or an icy surface, this disposition of the cross chain members results in an uneven wheel periphery, increased vibration of the entire vehicle and resulting uncomfortable riding qualities. Furthermore, as mentioned above, the cross links wear out rapidly on all but relatively soft surfaces.

This invention may be briefly described as a specially proportioned chain device to be used in conjunction with a rubber tire casing having a modified tread to provide traction and anti-skid protection with a decrease in the accompanying vibration, irrespective of road conditions.

Figs. 1 and 2 illustrate a presently preferred embodiment of the invention as it would be used on hard packed snow or icy road surfaces. To provide for sufficient traction and yet maintain a relatively smooth wheel periphery, there is provided a rubber tire casing 10 having a plurality of rectangular grooves channeling the surface of the tread 11. At least one of the grooves 12 is disposed at right angles to the tread 11 as shown in the drawings, i. e. parallel to the horizontal axis of the tire casing 10 when the casing is in its normal operative position, to serve as an anchor groove. Other grooves 13 are diagonally disposed with respect to the tread 11 as shown in the drawings. Each of the grooves, however, as shown in Fig. 5, is of sufficient depth and width to accommodate a cross chain traction member 16, made up of an assemblage of individual links of the conventional size and shape found in existing anti-skid chains.

Contained within the grooves are the cross chain traction members 16, each secured at one end to a mounting chain 15 adjacent to one side of the casing 10, and each removably secured at the opposite end to a second mounting chain 14 adjacent to the other side of the casing 10. Mounting cables such as 24 in Fig. 7 or other suitable mounting members may be used in lieu of the mounting chains 14, 15. The mounting chains are of the conventional construction utilized in the existing anti-skid chains and have suitably located, separable fastening devices 14a, 15a in the inner and outer mounting chains, to facilitate the mounting and removal of the traction device from the vehicle wheel.

When the cross chains 16 are positioned within the grooves, as described above, and the wheel is in its normal operative position on a vehicle, the weight of the vehicle will exert a sufficient compressive force upon the compressible, resilient rubber tread to deform said tread in the area contacting the road surface and adjacent thereto to permit the cross chains 16 to protrude an amount sufficient to provide effective traction upon an icy surface. The grooves 13 may be, if desired, of sufficient depth to cause the cross chains 16 to protrude a slight amount when contained therein. The chains will not, however, protrude to an extent necessary to cause the increased vibration which normally accompanies the use of conventional anti-skid chains upon an icy surface or upon hard packed snow. An even more important result is that the rate of wear of the chains is very slow, in comparison to the cross links of chains as ordinarily used; indeed experience indicates that with the arrangement of Figs. 1 and 2 and even where parts of the cross links may project slightly (e. g. a very small fraction of an inch) above the tire surface, the links do not wear at a significantly faster rate than the tire tread itself.

The angular disposition of the grooves 13, and the length of cross chain 16 contained therein, also provide for a more continuous contact between the effective tractional surface as determined by the chain members 16 and the road while the vehicle is in motion.

Rubber lugs may be provided, if desired, on the sides of the tire casing 10 to channel and contain the portions of the cross chains 16 adjacent to the ends thereof. These lugs will also aid in preventing independent rotation of the tire casing 10 with respect to the chain.

If heavy snow or soft earth is encountered, of a depth sufficient to necessitate the utilization of an increased tractional surface, the cross chains 16, disposed in the diagonal grooves 13, may be individually removed from the grooves and placed in the heavy duty position on the surface of the tread 11. The diagonal disposition of the grooves 13 provides a sufficient length of cross chain to encompass the surface of the tread 11 in the heavy duty operating position.

Figs. 3 and 4 show the traction device as it would be used in heavy snow or soft earth. In the heavy duty operating position the cross chain traction members 16, contained in the diagonally disposed grooves 13, are individually disengaged from the mounting chain 14 adjacent the casing 10, removed from the grooves 13 and reengaged with the mounting chain 14 with the cross chain traction members 16 traversing the surface of the tread 11. The length of cross chain 16 required to diagonally traverse the casing 10 when said chains are disposed in the diagonal grooves 13 is sufficient to encompass the surface of tread in the heavy duty position, where the cross chains may all be at right angles to the tire. The cross chain 16 disposed within the anchor groove 12 remains within said groove for heavy duty operation and prevents any independent rotation of the tire casing 10 with respect to the anti-skid chain when used in heavy snow or soft earth, i. e. both to provide better grip of the wheel and to keep the cross chains from slipping back into the diagonal grooves.

Fig. 6 shows a special tool which may be used to facilitate the changing of the position of the cross chain traction members in shifting to or from heavy duty operation. It comprises a pair of pliers with specially shaped jaws to provide additional leverage to easily disengage cross chain traction members from the mounting chains. A thin, elongated upper jaw 17, having a link receiving depression 18 near its extremity, operates in conjunction about a pivot 19, with a shorter lower jaw 20 which also has a link receiving depression 21 near its extremity. In operation, the upper jaw 17 is inserted into the aperture of the proper link so that the top of the connector link 22 is seated in the link receiving depression 18 and the lower jaw is inserted into the central aperture of the corresponding engaged link 23 in the mounting chain so that the link surface is seated in the link receiving depression 18. Moving the handles 27 and 28 together disengages the connector link 22 from the corresponding engaged link 23 in the circular mounting chain, thus freeing the cross chain which may then be relocated and reengaged with the mounting chain. In reengaging the connector link 22 with the mounting chain the tool may be used to provide the necessary leverage to bring the above members into an engageable position.

Fig. 7 illustrates an alternative embodiment of the invention utilizing a mounting cable 24, which may be a conventional stranded cable or suitable tensioning members, instead of the mounting chains 14 and 15 as shown in Figs. 1 through 4. In addition there is provided a plurality of anchor grooves 12 to continually contain the cross chains 16 in order to insure the prevention of any independent rotation of the tire casing 10 with respect to the anti-skid chain when used in heavy snow or soft earth, in addition to a plurality of diagonally disposed grooves 13. Rubber lugs 25 may also be provided, if desired, on the sides of the tire casing 10 to channel and contain the portions of the cross chains 16 adjacent to the ends thereof.

It is to be understood that the invention is not limited to the specific apparatus herein shown and described but may be embodied in other forms without departure from its spirit.

I claim:

1. A traction device comprising a tire casing having a plurality of chain receiving grooves diagonally traversing the tread in combination with an anti-skid device having a plurality of chain members secured at one end to a first mounting member and removably secured at the other end to a second mounting member at either of two connecting stations, said chain members being of a length determined in part by the distance between said mounting members and the ends of said grooves and in part by the length of said diagonal grooves.

2. In combination, a tire casing having a plurality of chain receiving grooves diagonally traversing the tread, an anti-skid chain comprising a plurality of chain members secured at one end to a first mounting member adjacent to one side of the casing and removably secured at the other end to a second mounting member adjacent to the other side of the casing at either of two connecting stations so that the chain members may be disposed within the grooves or may be disposed to traverse the surface of the tread.

3. In combination, a tire casing, a plurality of chain receiving grooves diagonally traversing the tread on the casing, at least one chain receiving groove perpendicularly traversing the tread, a first mounting member adjacent to one side of the casing, a second mounting member adjacent to the other side of the casing and a plurality of cross chain members individually secured at one end to the first mounting member and removably secured at the other end to the second mounting member at either of two connecting stations so that the cross chain members may be disposed within the diagonal grooves or may be disposed to traverse the surface of the tread.

4. In combination, a tire casing, a plurality of chain receiving grooves diagonally traversing the tread on the casing, at least one chain receiving groove perpendicularly traversing the tread, a first mounting cable adjacent to one side of the casing, a second mounting cable adjacent to the other side of the casing and a plurality of cross chain members individually secured at one end to the first mounting cable and removably secured at the other end to the second mounting cable at either of two connecting stations so that the cross chain members may be disposed within the diagonal grooves or may be disposed to traverse the surface of the tread.

5. In combination, a tire casing, a plurality of chain receiving grooves diagonally traversing the tread on the casing, at least one chain receiving groove perpendicularly traversing the tread, a first mounting chain adjacent to one side of the casing, a second mounting chain adjacent to the other side of the casing and a plurality of cross chain members individually secured at one end to the first mounting chain and removably secured at the other end to the second mounting chain at either of two connecting stations so that the cross chain members may be disposed within the diagonal grooves or may be disposed to traverse the surface of the tread.

6. A traction device comprising, in combination, a tire casing, a plurality of chain receiving grooves diagonally traversing the tread on said casing, a plurality of cross chain members disposed within said grooves individually secured at one end to a mounting chain adjacent one side of the casing and each individually removably secured at the other end to a second mounting chain adjacent to the other side of the casing at one of two connecting stations, said cross chain members capable of being individually disengaged from the first connecting station and reengaged to the other station traversing the surface of the tread.

7. A traction device comprising, in combination, a tire casing, a plurality of chain receiving grooves diagonally traversing the tread on the casing, at least one chain receiving groove perpendicularly traversing the tread, a first mounting chain adjacent to one side of the casing, a second mounting chain adjacent to the other side of the casing, a plurality of cross chain members disposed within said grooves individually secured at one end to the first mounting chain and individually removably secured at the other end to the second mounting chain at one of two connecting stations, each of said cross chain members contained within the diagonal grooves capable of being individually disengaged from the second mounting chain and individually reengaged at the other connecting station traversing the surface of the tread.

8. A traction device comprising, in combination, a tire casing, a plurality of chain receiving grooves diagonally traversing the tread on the casing, at least one chain receiving groove perpendicularly traversing the tread, a first mounting cable adjacent to one side of the casing, a second mounting cable adjacent to the other side of the casing, a plurality of cross chain members disposed within said grooves individually secured at one end to the first mounting cable and individually removably secured at the other end to the second mounting cable at one of two connecting stations, each of said cross chain members contained within the diagonal grooves capable of being individually disengaged from the second mounting cable and individually reengaged at the other connecting station traversing the surface of the tread.

9. For a traction device, a tire structure comprising a casing having a tread, a plurality of chain receiving grooves diagonally traversing the tread from one face to the other, and at least one chain receiving groove substantially perpendicularly traversing the tread from one face to the other, said grooves being spaced about the periphery of the casing, and each of said grooves being adapted to receive a cross chain of an anti-skid chain assembly each of said diagonal grooves being of a length sufficient to contain a cross chain of an extent adaptable to perpendicularly traverse the surface of the tread.

10. For a traction device, an anti-skid chain assembly comprising a spaced pair of side chains each adapted to be connected in circular relation adjacent the side of a tire casing, and a plurality of cross chains connecting said side chains, to traverse the tread of the tire casing, a plurality of said cross chains, but less than all of same, having a length between the side chains which is substantially longer than at least one other of said cross chains, each of said lesser plurality of cross chains having a removable fastening device at one end so that it may be secured to one of the side chains at either of two connecting stations.

JOHN J. COFFEY.

REFERENCES CITED

The following references are of record in the file of this patent:

UNITED STATES PATENTS

| Number | Name | Date |
| --- | --- | --- |
| 1,337,443 | Demas | Apr. 20, 1920 |
| 1,563,960 | Brockhurst | Dec. 1, 1925 |

FOREIGN PATENTS

| Number | Country | Date |
| --- | --- | --- |
| 10,550 | Great Britain | 1907 |